US011509550B2

(12) United States Patent
Itou et al.

(10) Patent No.: US 11,509,550 B2
(45) Date of Patent: Nov. 22, 2022

(54) COOPERATIVE LEARNING SYSTEM AND MONITORING SYSTEM

(71) Applicants: TOSHIBA DIGITAL SOLUTIONS CORPORATION, Kawasaki (JP); KURITA WATER INDUSTRIES LTD., Nakano-ku (JP)

(72) Inventors: Tadasuke Itou, Saitama (JP); Kazutoshi Nagano, Yokohama (JP)

(73) Assignees: TOSHIBA DIGITAL SOLUTIONS CORPORATION, Kawasaki (JP); KURITA WATER INDUSTRIES LTD., Nakano-ku (JP)

( * ) Notice: Subject to any disclaimer, the term of this patent is extended or adjusted under 35 U.S.C. 154(b) by 0 days.

(21) Appl. No.: 17/428,840

(22) PCT Filed: Jan. 23, 2020

(86) PCT No.: PCT/JP2020/002203
§ 371 (c)(1),
(2) Date: Aug. 5, 2021

(87) PCT Pub. No.: WO2020/179264
PCT Pub. Date: Sep. 10, 2020

(65) Prior Publication Data
US 2022/0131772 A1 Apr. 28, 2022

(30) Foreign Application Priority Data
Mar. 7, 2019 (JP) .............................. JP2019-041166

(51) Int. Cl.
*H04L 43/04* (2022.01)
*H04L 41/16* (2022.01)
(Continued)

(52) U.S. Cl.
CPC .............. *H04L 43/04* (2013.01); *H04L 41/16* (2013.01); *H04L 43/0817* (2013.01); *H04L 65/61* (2022.05)

(58) Field of Classification Search
CPC ...... H04L 43/04; H04L 41/16; H04L 43/0817
See application file for complete search history.

(56) References Cited

U.S. PATENT DOCUMENTS 10,968,114 B2 * 4/2021 Vielma .................... C02F 1/281
2005/0125474 A1 * 6/2005 Pednault ................. G06F 17/18
708/400

(Continued)

FOREIGN PATENT DOCUMENTS

JP 5022610 B2 9/2012
JP 2016-195974 A 11/2016

(Continued)

OTHER PUBLICATIONS

International Search Report dated Mar. 17, 2020 in PCT/JP2020/002203 filed Jan. 23, 2020, 2 pages.

*Primary Examiner* — Philip C Lee
(74) *Attorney, Agent, or Firm* — Oblon, McClelland, Maier & Neustadt, L.L.P.

(57) ABSTRACT

A cooperative learning system usable for process monitoring in which a monitoring model is provided for each of plural processes arranged in chronological order at predetermined transition time period intervals. The system stores, in chronological order, first monitoring data in a first process, second monitoring data in a second process, and at least one monitoring result from the first process output from a first monitoring model using the first monitoring data as an input parameter. The system performs parent model learning processing for the first monitoring model using the first monitoring data and the monitoring result from the first monitoring model, and performs child model learning processing (Continued)

for a second monitoring model using a monitoring result from the first monitoring model at a first time as teacher data and using the second monitoring data at a second time shifted from the first time by a transition period as an input parameter.

8 Claims, 5 Drawing Sheets

(51) Int. Cl.
*H04L 43/0817* (2022.01)
*H04L 65/61* (2022.01)

(56) References Cited

U.S. PATENT DOCUMENTS

| | | | |
|---|---|---|---|
| 2011/0288837 A1* | 11/2011 | Blevins | G05B 17/02 |
| | | | 703/6 |
| 2011/0301734 A1* | 12/2011 | Krehbiel | G05B 19/418 |
| | | | 700/99 |
| 2018/0105858 A1* | 4/2018 | Nakazono | G01N 33/1866 |
| 2018/0297880 A1* | 10/2018 | Wiemers | C02F 1/56 |
| 2020/0026196 A1* | 1/2020 | Luo | G03F 7/705 |
| 2020/0097623 A1* | 3/2020 | Palmer | G06Q 10/067 |

FOREIGN PATENT DOCUMENTS

| | | |
|---|---|---|
| JP | 2017-157072 A | 9/2017 |
| JP | 2018-63656 A | 4/2018 |
| KR | 10-2012-0098390 | 9/2012 |

\* cited by examiner

COOPERATIVE LEARNING SYSTEM AND MONITORING SYSTEM

TECHNICAL FIELD

Embodiments of the present invention relate to a process improvement method and a monitoring technique in treatment processes or manufacturing processes arranged in chronological order.

BACKGROUND ART

For example, water treatment is performed to improve water quality through a plurality of treatment processes arranged in chronological order. At each of the treatment processes into which water sequentially flows, monitoring data measured and sensed by sensors and other devices is collected. The collected monitoring data is input to a monitoring system, and the monitoring system determines normal operation or abnormal operation for each treatment process.

PRIOR ART DOCUMENTS

Patent Documents

[Patent Document 1] Japanese Patent Laid-Open No. 2016-195974
[Patent Document 2] Japanese Patent Laid-Open No. 2017-157072
[Patent Document 3] Japanese Patent Laid-Open No. 2018-63656
[Patent Document 4] Japanese Patent No. 5022610

DISCLOSURE OF THE INVENTION

Problems to be Solved by the Invention

It is an object of the present invention to provide a cooperative learning system for use in monitoring a plurality of processes arranged in chronological order to achieve improved efficiency of the processes as a whole.

Means for Solving the Problems

According to an embodiment, a cooperative learning system comprises a computer system for use in process monitoring in which a monitoring model is provided for each of a plurality of processes arranged in chronological order at predetermined transition time period intervals. The cooperative learning system includes a storage section storing, in chronological order, first monitoring data in a first process, second monitoring data in a second process upstream or downstream of the first process, and at least one monitoring result from the first process output from a first monitoring model using the first monitoring data as an input parameter, and a model learning section configured to perform parent model learning processing for the first monitoring model by using the first monitoring data and the monitoring result from the first monitoring model and to perform child model learning processing for a second monitoring model by using a monitoring result from the first monitoring model at a first time as teacher data and using the second monitoring data at a second time as an input parameter, the second time being shifted from the first time by a transition period.

BRIEF DESCRIPTION OF THE DRAWINGS

FIG. 4 A diagram showing an example of constructing a cooperative learning model (a monitoring model downstream of the origin process) for monitoring each process according to Embodiment 1.

MODE FOR CARRYING OUT THE INVENTION

An embodiment of the present invention will hereinafter be described with reference to the accompanying drawings.

Embodiment 1

Figure 1:
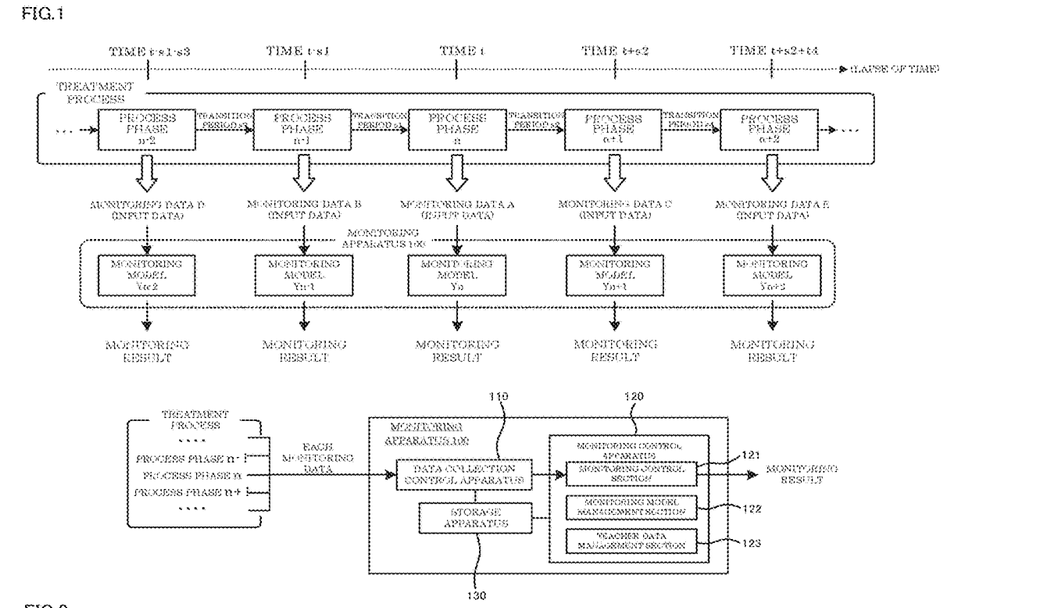
FIG. 1 A diagram for explaining functional blocks of a monitoring system according to Embodiment 1 of the present invention.

FIGS. 1 to 8 are diagrams for explaining a process improvement method using a cooperative learning model according to Embodiment 1 of the present invention. FIG. 1 is a diagram showing functional blocks of a monitoring system to which a cooperative learning system is applied. As shown in FIG. 1, a monitoring apparatus 100 receives input of monitoring data collected from a plurality of processes arranged in chronological order and uses monitoring results from monitoring models provided separately for the plurality of processes to manage all the processes.

An exemplary process procedure including a plurality of processes arranged in chronological order is water treatment. The water treatment is performed to purify water through processes involving a regulating tank, an aeration tank, a settling tank, and an aggregation tank, all of which water sequentially flows into and from. The tanks are arranged in chronological order at predetermined transition time period intervals. The water treatment processes are managed as a whole by monitoring the respective tanks.

The mechanism of cooperative learning according to embodiment 1 can be applied to process management other than improvement and management of the water treatment process. For example, the cooperative learning model can be applied to process monitoring for two or more processes arranged in chronological order at predetermined transition time period intervals such as a manufacturing line for products or materials, a processing line for heat treatment or chemical treatment, and an incineration line for garbage and waste.

In the example of FIG. 1, a treatment process includes a process phase n set at an origin process. With the process phase n at the origin, upstream processes are represented as process phases n−1 and n−2, while downstream processes are represented as n+1 and n+2. Since these process phases are a plurality of processes arranged in chronological order, a target treated at a time t during the process phase n should be treated at a time during each of the other processes shifted from the time t, the shift being a transition period between that process and the process phase n. In other words, the target under treatment at a certain time during the process phase n is in a treated status in the preceding process phase n−1 and is in a waiting status in the succeeding process phase n+1.

In Embodiment 1, a monitoring model is set for each process phase and outputs its monitoring result in each process phase. The monitoring model is a determination logic which receives monitoring data as an input parameter and determines whether the associated process phase is in a normal status or an abnormal status. The monitoring model is customized for the particularity and environment of the process through machine learning.

The monitoring data is sensor information output from sensor devices provided at the respective processes. The monitoring data includes, for example, values representing temperature information, information about facility operation, and information about water quality, as well as image data taken by an imaging apparatus such as a camera. For example, the monitoring model sets a threshold value and/or reference image data for determining a normal/abnormal status, determines whether the input sensor value is above the threshold value or whether the matching rate with the reference image data is below the threshold value, and outputs the determination result as a monitoring result. These monitoring results and the monitoring data (measured values) are used to perform machine learning, thereby constructing the optimized monitoring model with updated criteria.

The monitoring apparatus 100 of Embodiment 1 receives input of monitoring data acquired at each of the process phases included in the treatment process. A data collection control apparatus 110 controls the collection of monitoring data output from each of the plurality of processes and stores the monitoring data into a storage apparatus 130 in chronological order. A monitoring control apparatus 120 sets a monitoring model for each of the plurality of processes and uses each of the set monitoring models to output the monitoring result based on the monitoring data for each of the processes. These monitoring results are stored into the storage apparatus 130 in chronological order. The monitoring control is performed by a monitoring control section 121.

The monitoring control apparatus 120 according to Embodiment 1 includes a cooperative learning apparatus which controls the learning of the monitoring model for each process. In the example of FIG. 1, a monitoring model management section 122 and a teacher data management section 123 constructs a cooperative learning system. While Embodiment 1 is described in an exemplary aspect in which the cooperative learning system is built into the monitoring apparatus 100, the present invention is not limited thereto. For example, an independent cooperative learning system may be constructed to be connected to the monitoring apparatus 100 from outside. The cooperative learning system may also be applied as a learning system connected to the monitoring apparatus 100 over a network or the like.

Figure 2:
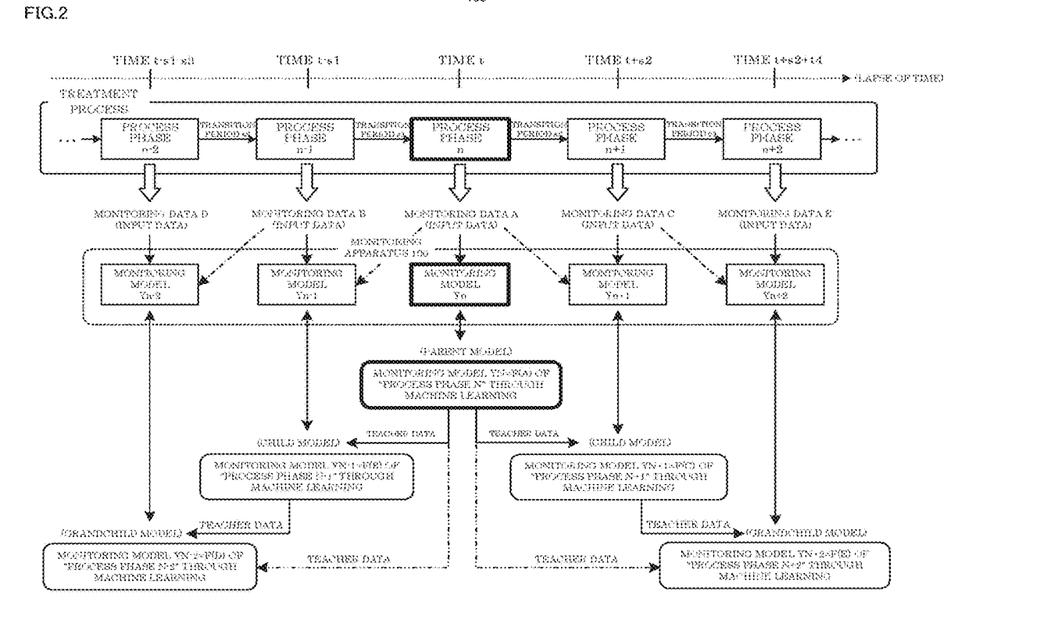
FIG. 2 An explanatory diagram of a cooperative learning model according to Embodiment 1.

FIG. 2 is an explanatory diagram of the cooperative learning model according to Embodiment 1. Learning processing and teacher data creation processing in the cooperative learning system can be performed at an arbitrary time.

First, the monitoring model management section 122 sets a parent model serving as an origin process. For example, the monitoring model management section 122 sets a monitoring model Yn for a process phase n as the parent model, and performs parent model learning processing through machine learning for the monitoring model Yn by using monitoring data A (first monitoring data) and a monitoring result from the monitoring model Yn (first monitoring model) as well as teacher data predefined for the monitoring model Yn. The parent model learning processing can be performed according to a known technique. Child model learning processing, later described, can similarly be performed according to a known technique through machine learning using teacher data.

The monitoring model of each process phase upstream or downstream of the origin process is constructed through machine learning in which the monitoring result from the monitoring model Yn serving as the parent model is used as teacher data. The monitoring model management section 122 performs child model learning processing for each of monitoring models Yn−1 and Yn+1 for the process phases n−1 and n+1 by using, as teacher data, the monitoring result from the monitoring model Yn constructed through the parent model learning processing.

In addition, for the process phase upstream of the process phase n−1, the monitoring model management section 122 performs child model learning processing for a monitoring model Yn−2 by using, as teacher data, the monitoring result from the monitoring model Yn−1 constructed through the child model learning processing using the teacher data of the parent model. This operation is similarly performed in the process phase n+2 downstream of the process phase n+1, and the monitoring model management section 122 performs child model learning processing for a monitoring model Yn+2 by using, as teacher data, the monitoring result from the monitoring model Yn+1 constructed through the child model learning processing using the teacher data of the parent model.

It should be noted that, for each process of the process phase n−2 and the process phase n+2, as shown in chain double-dashed lines, the child model learning processing for the monitoring models Yn−2 and Yn+2 for the process phases n−2 and n+2 may be performed by using, as teacher data, the monitoring result from the monitoring model Yn constructed through the parent model learning processing.

Figure 3:
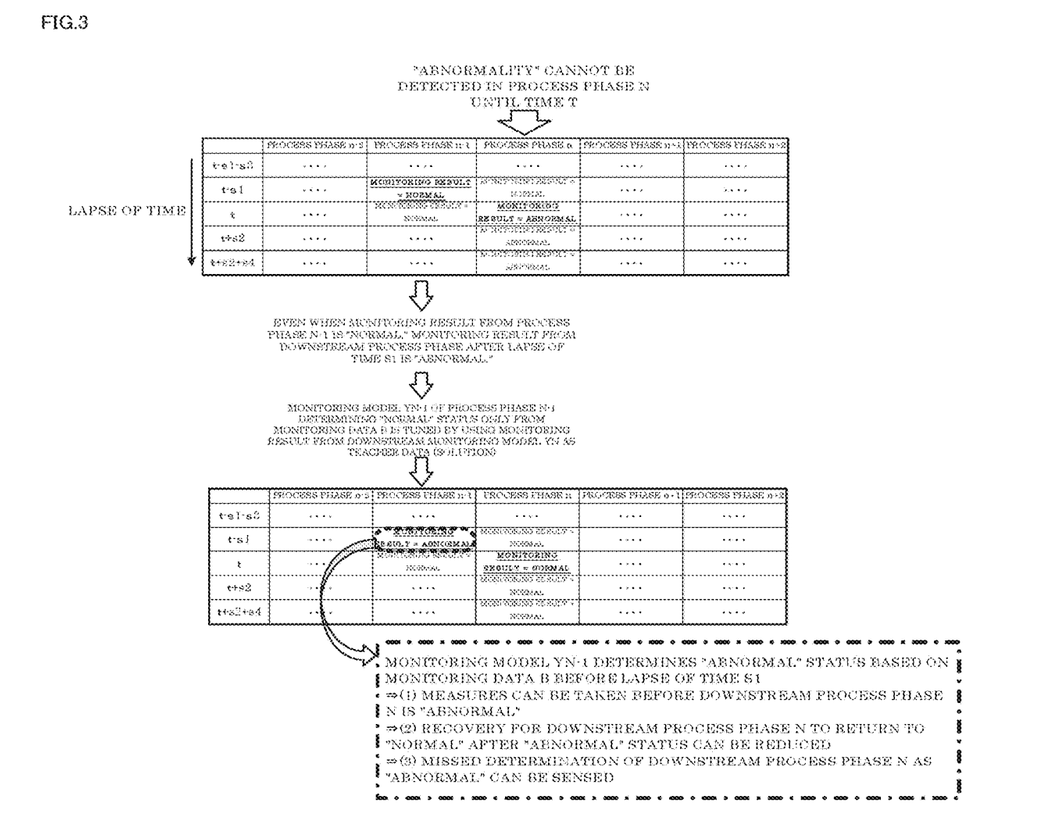
FIG. 3 A diagram showing an example of constructing the cooperative learning model (a monitoring model upstream of an origin process) for monitoring each process according to Embodiment 1.

FIG. 3 is a diagram showing an example of constructing a cooperative learning model for monitoring each process according to Embodiment 1 and illustrating cooperative learning processing in a monitoring model upstream of the origin process.

Monitoring data A of the process phase n (first process), monitoring data B of the process phase n−1 (second process) upstream of the process phase n, monitoring results from the process phase n output from the monitoring model Yn using the monitoring data A as an input parameter, and monitoring results from the process phase n−1 output from the monitoring model Yn−1 using the monitoring data B as an input parameter are stored in chronological order.

When an abnormality is detected at the time t during the process phase n serving as the origin process, the monitoring result from the upstream process phase n−1 is normal. In other words, even when the monitoring result from the process phase n−1 is "normal," the monitoring result is "abnormal" in the downstream process phase n after the lapse of a transition period s1. Even when the monitoring result from the process phase n−1 is normal at a time t−s1, the monitoring result from the downstream process phase n is abnormal after the lapse of the time period s1, so that the monitoring model Yn−1 for the process phase n−1 determining "normal" only from the monitoring data B is subjected to learning processing by using the monitoring result from the downstream monitoring model Yn as teacher data (solution).

The monitoring model management section 122 performs child model learning processing by using the monitoring result from the monitoring model Yn (first monitoring model) at the time t (first time) as teacher data (solution) and setting the monitoring data B (second monitoring data) at the time t−s1 (second time) shifted from the time t (first time) by the transition period s1 as an input parameter. The teacher data management section 123 manages the monitoring results from the process used as the teacher data and the monitoring data causing those monitoring results in chronological order in view of the transition period between the processes and provides the data necessary for the learning processing to the monitoring model management section 122.

The configuration described above allows the monitoring model Yn−1 to determine an "abnormal" status of the downstream process phase n based on the monitoring data B before the lapse of the time period s1. Thus, (1) some measures can be taken before the downstream process phase n is "abnormal," (2) some measures can be taken before the downstream process phase n is "abnormal," so that even when an "abnormal" status is actually detected later, a recovery time to return to a "normal" status can be reduced, and (3) any missed determination of the downstream process phase n as "abnormal" can be sensed. Specifically, for the point (3), in case that the determination of abnormality should be made in the monitoring result after the lapse of the period s1 but is not made for some reason, the advance sensing of "abnormality" with the monitoring model Yn−1 before the lapse of the time period s1 can be recorded, and when the monitoring result from the monitoring model Yn at the time t after the lapse of the time period s1 is "normal," an alarm indicating the sensing of abnormality can be output in the process phase n.

FIG. 4 is a diagram showing an example of constructing the cooperative learning model for monitoring each process according to Embodiment 1 and illustrating cooperative learning processing in a monitoring model downstream of the origin process.

Monitoring data A of the process phase n (first process), monitoring data C of the process phase n+1 (second process) downstream of the process phase n, monitoring results from the process phase n output from the monitoring model Yn using the monitoring data A as an input parameter, and monitoring results from the process phase n+1 output from the monitoring model Yn+1 using the monitoring data C as an input parameter are stored in chronological order.

When an abnormality is detected at the time t during the process phase n serving as the origin process, the monitoring result from the downstream process phase n+1 is normal at the same time t. In other words, even when the monitoring result from the process phase n+1 is "normal," the monitoring result is "abnormal" in the upstream process phase n before the lapse of a transition period s2. Even when the monitoring result from the process phase n+1 is normal at the time t, the monitoring result is abnormal after the lapse of the time period s2, so that the monitoring model Yn+1 for the process phase n+1 determining "normal" only from the monitoring data C is subjected to learning processing by using the monitoring result from the upstream monitoring model Yn as teacher data (solution).

The monitoring model management section 122 performs child model learning processing by using the monitoring result from the monitoring model Yn (first monitoring model) at the time t (first time) as teacher data (solution) and setting the monitoring data C (second monitoring data) at a time t+s2 (second time) shifted from the time t (first time) by the transition period s2 as an input parameter. The teacher data management section 123 manages the monitoring results from the process used as the teacher data and the monitoring data causing those monitoring results in chronological order in view of the transition period between the processes and provides the data necessary for the learning processing to the monitoring model management section 122.

Thus, the monitoring model Yn+1 can sense an "abnormality" based on the monitoring data C in conjunction with the abnormality in the upstream process phase n before the lapse of the time period s2. As a result, (4) the tendency of the upstream process phase n to be "abnormal" can be known previously in the downstream process phase n+1, (5) some measures can be taken in advance for the downstream process phase n+1 based on the "abnormal" status in the upstream process phase n, and (6) any missed determination of the upstream process phase n as "abnormal" can be sensed. Specifically, for the point (6), in case that the determination of abnormality should be made in the monitoring result at the time t during the process phase n but is not made for some reason, the advance sensing of "abnormality" with the monitoring model Yn+1 before the lapse of the time period s2 can be recorded, and when the monitoring result from the monitoring model Yn at the time t before the lapse of the time period s2 is "normal," an alarm indicating the sensing of abnormality can be output in the process phase n+1.

As described above, for the process phase n−2 upstream of the process phase n−1 (second process), monitoring data D of the process phase n−2 (third process) and monitoring results from the process phase n−1 (second process) output from the monitoring model Yn−1 (second monitoring model) constructed through the child model learning processing by using the monitoring data B (second monitoring data) as an input parameter are stored in chronological order. The monitoring model management section 122 can perform child model learning processing by using the monitoring result from the monitoring model Yn−1 (second monitoring model) at the time t−s1 (third time) as teacher data (solution) and setting the monitoring data D (third monitoring data) at a t−s1−s3 (fourth time) shifted from the time t−s1 (third time) by a transition period s3 as an input parameter. From the viewpoint of the parent model, the monitoring model Yn−2 serves as a grandchild model. This operation is similarly performed in the process phase Yn+2.

Instead of the monitoring result from the process phase Yn−1, the monitoring result from the parent model for the process phase Yn can be used as the teacher data in the child model learning processing for the process phase n−2. In this case, the monitoring data D (third monitoring data) of the process phase n−2 (third process) upstream of the process phase n−1 (second process) is stored along with monitoring results from the monitoring model Yn in chronological order, and the monitoring model management section 122 can perform child model learning processing by using the monitoring result from the monitoring model Yn (first monitoring model) at the time t (first time) as teacher data and setting the monitoring data D (third monitoring data) at the t−s1−s3 (fifth time) shifted from the time t (first time) by a transition period s1+s3 as an input parameter. In this case, from the viewpoint of the parent model, the monitoring model Yn−2 serves as a child model similarly to the monitoring model Yn−1. This operation is similarly performed in the process phase Yn+2.

Figure 5:
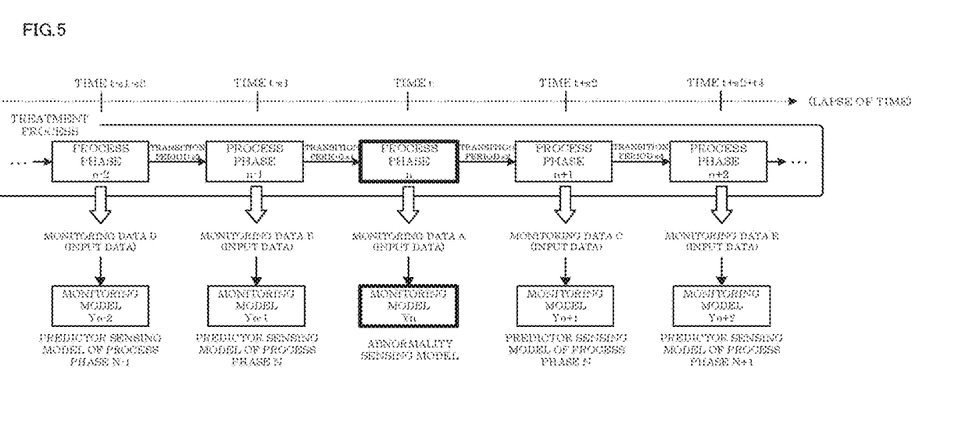
FIG. 5 A diagram for explaining the relationship between cooperative learning models with respect to the origin process in a plurality of processes arranged in chronological order according to Embodiment 1.

FIG. 5 is a diagram for explaining the relationship between cooperative learning modes with respect to the origin process in a plurality of processes arranged in chronological order according to Embodiment 1. As shown in FIG. 5, the construction of the cooperative learning model configures the monitoring models at the respective process phases as a predictor sensing model centered on the origin process. The monitoring model Yn for the origin process is constructed as a predictor sensing model serving as a parent, the monitoring model Yn−1 for the preceding process is constructed as a predictor sensing model for the process phase n, and the monitoring model Yn−2 for the preceding process is constructed as a predictor sensing model for the process phase n−1. The monitoring model Yn+1 for the succeeding process is constructed as a predictor sensing model for the process phase n, and the monitoring model Yn+2 for the succeeding process is constructed as a predictor sensing model for the process phase n+1.

Figure 6:
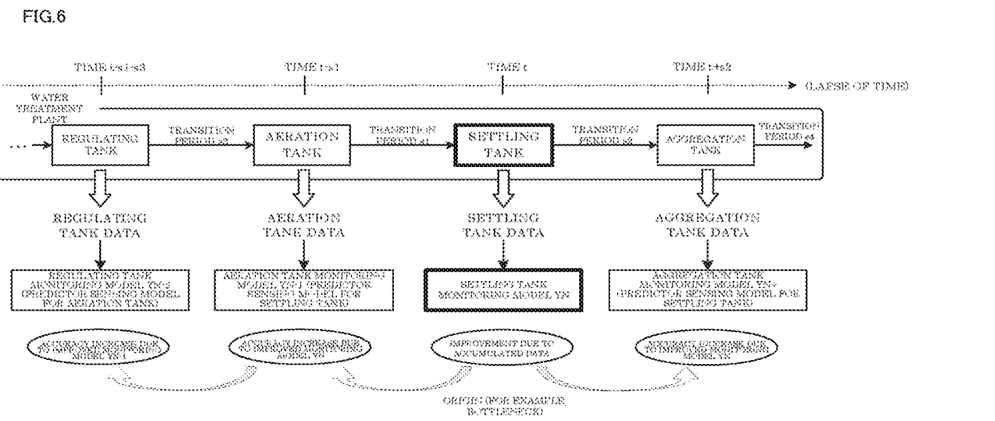
FIG. 6 A diagram showing an example of process improvement in water treatment to which the cooperative learning model according to Embodiment 1 is applied.
Figure 7:
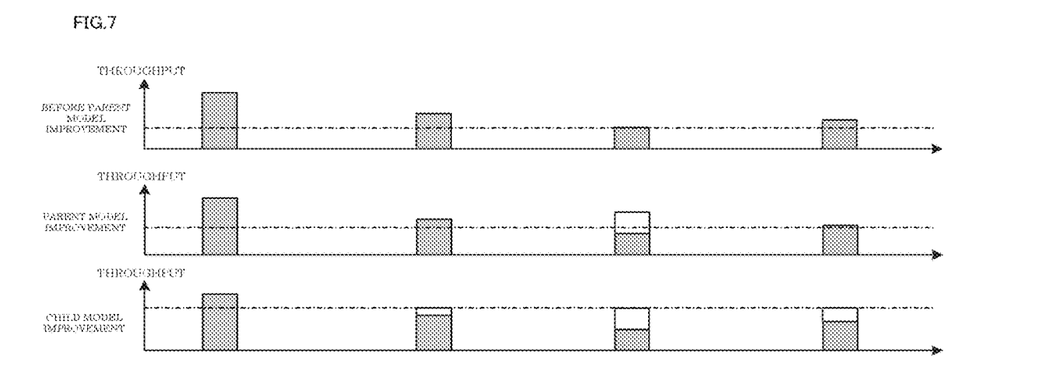
FIG. 7 A diagram for explaining an example of improvement of all processes based on a bottleneck process with the cooperative learning model according to Embodiment 1.

FIG. 6 is a diagram showing an example of process improvement in water treatment to which the cooperative learning model according to Embodiment 1 is applied. FIG. 7 is a diagram for explaining an example of improvement of all processes based on a bottleneck process with the cooperative learning model according to Embodiment 1.

In the cooperative learning model according to Embodiment 1, the determination accuracy of the parent model is increased through the parent model learning processing, the determination accuracy of the child model is increased in conjunction therewith. As shown in FIG. 7, water treatment involves a bottleneck process acting as a bottleneck, and the treatment capacity in the bottleneck process affects the treatment capacity of the processes as a whole. It is thus important to increase the accuracy of the monitoring model for the bottleneck process to improve the throughput. The monitoring models for the processes other than the bottleneck process are not individually tuned for the improved throughput of the bottleneck process, but the monitoring models for the other processes are improved in accuracy in conjunction with the bottleneck process through the cooperative learning, thereby achieving the improved throughput of the processes as a whole. In the example of FIG. 7, white areas represent improved throughput (increased throughput), which shows that the throughputs of the other processes are improved in conjunction with the bottleneck process.

The increased monitoring accuracy of the parent model allows predictor sensing models for the process phase n (bottleneck process) of the parent model to be constructed in the process phases n−1 and n+1, and the construction of the predictor sensing models allows a further increase in monitoring accuracy of the process phase n, which represents a virtuous cycle. Since the increased monitoring accuracy of the process phase n serving as the bottleneck leads to the improved throughput of the process phase n, the throughputs (treatment capacities) of the process phases n−1 and n+1 can be improved in conjunction therewith. Consequently, the level of the throughput of the processes as a whole can be raised.

Figure 8:
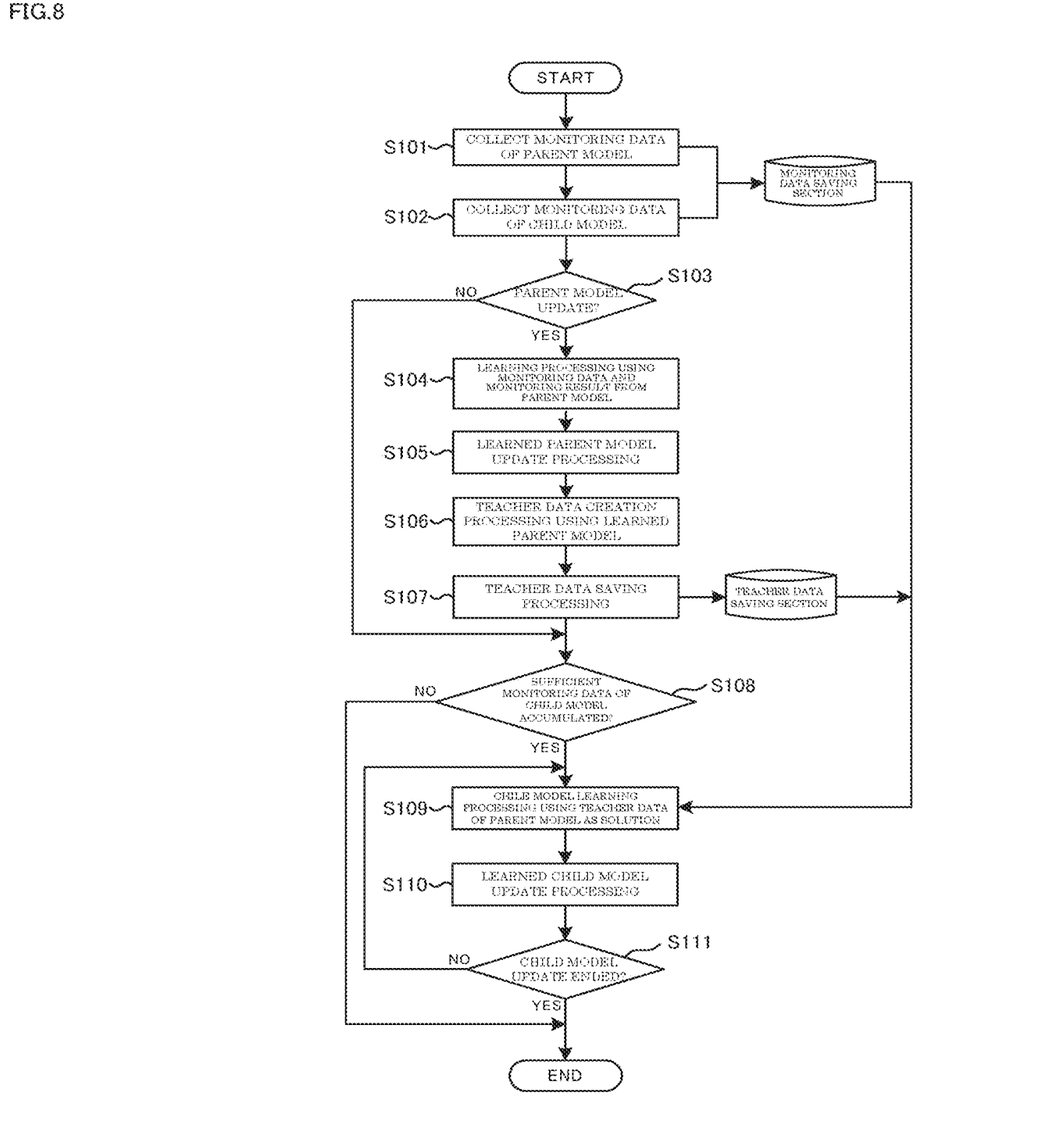
FIG. 8 A flow chart showing processing of constructing and updating the cooperative learning model according to Embodiment 1.

FIG. 8 is a flow chart showing processing of constructing and updating the cooperative learning model according to Embodiment 1. First, a particular one of a plurality of processes arranged in chronological order at predetermined transition time period intervals is set as an origin process serving as a parent model (for example, a bottleneck process). Then, monitoring data from the process phase of the parent model and monitoring data from process phases of the respective child models are collected in chronological order. The processing of collecting the monitoring data is performed by the data collection control apparatus 110 serving as an interface to each process phase, and the collected monitoring data is stored in the storage apparatus 130 (monitoring data saving section) (S101, S102).

Along with the collection of the monitoring data, the monitoring control section 121 performs monitoring control using the monitoring model set for each process and outputs the monitoring result. The monitoring result is stored in the storage apparatus 130 in association with the collected monitoring data.

Next, the monitoring model management section 122 performs model update processing, that is, model learning processing, at a preset timing. The monitoring model management section 122 first performs parent model update processing (YES at S103).

The monitoring model management section 122 performs parent model learning processing by using the monitoring data from the process phase associated with the parent model and the monitoring result from the monitoring model of the parent model (S104) and updates the monitoring model as a learned parent model (S105).

The teacher data management section 122 creates, in response to the updated parent model learning, teacher data for use in child model learning processing and stores the created teacher data in the storage apparatus (S106, S107). Specifically, the teacher data management section 122 verifies the updated parent model based on the updated parent model and the monitoring data accumulated in chronological order and outputs the verification result as an inference result. For example, the teacher data management section 122 can verify that the determination result at a time t+s1 is inferred as being "abnormal." The inference result at the time t+s1 is created as teacher data and is saved.

Once the teacher data is created, the monitoring model management section 122 performs child model learning processing. In a process phase subjected to the child model learning, it is checked whether or not sufficient monitoring data is accumulated. When the amount of accumulated monitoring data is less than a predetermined value (number or quantity), the child model learning processing may not be performed immediately but after sufficient information is accumulated.

When it is determined that the sufficient monitoring data is accumulated in the process phase subjected to the child model learning (YES at S108), the monitoring model management section 122 uses the created teacher data to perform the child model learning processing (S109). Specifically, the monitoring model management section 122 uses the inference result at the time t+s1 as the solution and retrieves the monitoring data in the process phase of the child model at the time t (the transition period s1 before the time t+s1 for the parent model) from the storage apparatus 130 to perform learning processing for the monitoring data in the process phase of the child model at the time 1, thereby performing learned child model update processing (S110). The monitoring model management section 122 performs the child model learning processing sequentially for all or selected child models, and then ends the child model learning processing (YES at S111).

While the above description is made for the configuration in which the monitoring model outputs the monitoring result only from the monitoring data in each process, the present invention is not limited thereto. For example, the monitoring data of the parent model may also be used to construct the child model.

For example, the monitoring result from the monitoring model Yn at the time t+s1 can be used as teacher data, and the monitoring data B at the time t and the monitoring data A at the time t can be used as input parameters to perform child model learning processing for the monitoring model Yn−1. In this case, both the monitoring data B and the monitoring data A at the predetermined same time serve as the input parameters for the monitoring model Yn−1 in monitoring control.

Thus, as indicated by chain lines in the example of FIG. 2, the monitoring model Yn−1 for the process phase n−1 is configured as a monitoring model (Yn−1=f(B,A)) which uses the monitoring data B and the monitoring data A at the same time as explanatory variables to provide the monitoring result (objective variable) Yn−1 from the process phase n−1. In this case, the learning of the monitoring model Yn−1 is configured such that learning processing is performed by using the monitoring result from the monitoring model Yn at the time 1 as teacher data, and the monitoring data B and the monitoring data A at the same time t−s1 as two input parameters, the time t−s1 being shifted from the time t1 by the transition period s1. It should be noted that the learning processing may be performed by using, as teacher data, a set of monitoring data at a predetermined time and the monitoring result from the associated monitoring model.

According to Embodiment 1, the cooperative learning system can be used in monitoring the plurality of processes arranged in chronological order to achieve improved efficiency of the processes as a whole.

Particularly, the learning processing is performed such that the status of the process upstream or downstream of the origin process serving as the bottleneck is found at the time t' shifted from the time t by the transition period between the processes, the time t being the time point when the monitoring result from the origin process is output, and the monitoring result from the origin process (which may include the associated monitoring data) is reflected in each monitoring model for the upstream or downstream process back or earlier by the transition period (see FIGS. 3 and 4). Thus, the monitoring model for monitoring each process is constructed as a predictor sensing model cooperating with the monitoring model for the origin process to allow the improved efficiency of the processes as a whole.

While Embodiment 1 has been described, the monitoring apparatus 100 can include, as a hardware configuration, a memory (main storage apparatus), operation input means such as a mouse, keyboard, touch panel, and scanner, output means such as a printer, and an auxiliary storage apparatus (such as a hard disk), in addition to the components described above.

The functions of the present invention can be implemented by a program. A computer program previously provided for implementing each function can be stored on an auxiliary storage apparatus, the program stored on the auxiliary storage apparatus can be read by a control section such as a CPU to a main storage apparatus, and the program read to the main storage apparatus can be executed by the control section to allow a computer to perform the function of each component in the present invention. Each of the functions of the monitoring apparatus 100 and the cooperative learning system can also be implemented by a different one of apparatuses, and those apparatuses can be connected directly or via a network to constitute a computer system.

The program may be recorded on a computer readable recording medium and provided for the computer. Examples of the computer readable recording medium include optical disks such as a CD-ROM, phase-change optical disks such as a DVD-ROM, magneto-optical disks such as a Magnet-Optical (MO) disk and Mini Disk (MD), magnetic disks such as a floppy Disk® and removable hard disk, and memory cards such as a compact Flash®, smart media, SD memory card, and memory stick. Hardware apparatuses such as an integrated circuit (such as an IC chip) designed and configured specifically for the purpose of the present invention are included in the recording medium.

While the embodiment of the present invention has been described, the embodiment is only illustrative and is not intended to limit the scope of the present invention. The novel embodiment can be implemented in various other forms, and various omissions, substitutions, and modifications can be made thereto without departing from the spirit or scope of the present invention. The embodiment and its variations are encompassed within the spirit or scope of the present invention and within the invention set forth in the claims and the equivalents thereof.

DESCRIPTION OF THE REFERENCE NUMERALS

100 MONITORING APPARATUS
110 DATA COLLECTION CONTROL APPARATUS
120 MONITORING CONTROL APPARATUS
121 MONITORING CONTROL SECTION
122 MONITORING MODEL MANAGEMENT SECTION
123 TEACHER DATA MANAGEMENT SECTION
n PROCESS
Yn MONITORING MODEL

The invention claimed is:
1. A cooperative learning system for use in process monitoring in which a monitoring model is provided for each of a plurality of processes arranged in chronological order at predetermined transmission time intervals, the cooperative learning system comprising:
a memory storing, in chronological order, first monitoring data in a first process, second monitoring data in a second process upstream or downstream of the first process, and at least one monitoring result from the first process output from a first monitoring model using the first monitoring data as an input parameter; and
processing circuitry configured to perform parent model learning processing for the first monitoring model by using the first monitoring data and the monitoring result from the first monitoring model and to perform child model learning processing for a second monitoring model by using a monitoring result from the first monitoring model at a first time as teacher data and using the second monitoring data at a second time as an input parameter, the second time being shifted from the first time by a transition period, wherein
the processing circuitry is configured to perform the child model learning processing for the second monitoring model by using the monitoring result from the first monitoring model at the first time obtained as teacher data and using, as input parameters, the second monitoring data obtained in the second process at the second time and the first monitoring data obtained in the first process at a same time as the second time.

2. The cooperative learning system according to claim 1, wherein third monitoring data in a third process upstream or downstream of the second process, and at least one monitoring result from the second process output from the second monitoring model constructed through the child model learning processing using the second monitoring data as an input parameter are stored in chronological order, and the processing circuitry is configured to perform the child model learning processing for a third monitoring model by using a monitoring result from the second monitoring model at a third time as teacher data and using the third monitoring data at a fourth time as an input parameter, the fourth time being shifted from the third time by a transition period.

3. The cooperative learning system according to claim 1, wherein third monitoring data in a third process upstream or downstream of the second process is stored in chronological order, the processing circuitry is configured to perform the child model learning processing for a third monitoring model by using a monitoring result from the first monitoring model at the first time as teacher data and using the third monitoring data at a fifth time as an input parameter, the fifth time being shifted from the first time by a transition period.

4. The cooperative learning system according to claim 1, wherein the first process is a process acting as a bottleneck in all of the plurality of processes arranged in chronological order at predetermined transition time period intervals.

5. A monitoring system for performing process monitoring in a plurality of processes arranged in chronological order at predetermined transmission time intervals, the monitoring system comprising:

a data collection control apparatus including data collection circuitry configured to collect monitoring data output from each of the plurality of processes;

a monitoring control apparatus including monitoring control circuitry configured to use a monitoring model set for each of the plurality of processes to output at least one monitoring result based on the monitoring data for each process; and a cooperative learning apparatus including processing circuitry configured to control learning of the monitoring model for each process, wherein the processing circuitry is configured to:
store, in chronological order, first monitoring data in a first process, second monitoring data in a second process upstream or downstream of the first process, and at least one monitoring result from the first process output from a first monitoring model using the first monitoring data as an input parameter, and perform parent model learning processing for the first monitoring model by using the first monitoring data and the monitoring result from the first monitoring model and perform child model learning processing for a second monitoring model by using a monitoring result from the first monitoring model at a first time as teacher data and using the second monitoring data at a second time as an input parameter, the second time being shifted from the first time by a transition period, wherein the processing circuitry is configured to perform the child model learning processing for the second monitoring model by using the monitoring result from the first monitoring model at the first time obtained as teacher data and using, as input parameters, the second monitoring data obtained in the second process at the second time and the first monitoring data obtained in the first process at a same time as the second time.

6. The monitoring system according to claim 5, wherein the first process is a process acting as a bottleneck in all of the plurality of processes arranged in chronological order at predetermined transition time period intervals, and the plurality of processes comprise water treatment processes.

7. A non-transitory computer-readable storage medium including computer executable instructions, wherein the instructions, when executed by a computer for performing cooperative learning processing in process monitoring in which a monitoring model is provided for each of a plurality of processes arranged in chronological order at predetermined transmission time intervals, cause the computer to perform:

a first function of storing, in chronological order, first monitoring data in a first process, second monitoring data in a second process upstream or downstream of the first process, and at least one monitoring result from the first process output from a first monitoring model using the first monitoring data as an input parameter; and a second function of performing parent model learning processing for the first monitoring model by using the first monitoring data and the monitoring result from the first monitoring model and performing child model learning processing for a second monitoring model by using a monitoring result from the first monitoring model at a first time as teacher data and using the second monitoring data at a second time as an input parameter, the second time being shifted from the first time by a transition period, wherein the performing of the child model learning processing for the second monitoring model is performed by using the monitoring result from the first monitoring model at the first time obtained as teacher data and using, as input parameters, the second monitoring data obtained in the second process at the second time and the first monitoring data obtained in the first process at a same time as the second time.

8. A non-transitory computer-readable storage medium including computer executable instructions, wherein the instructions, when executed by a computer for performing process monitoring in a plurality of processes arranged in chronological order at predetermined transmission time intervals, cause the computer to perform:

a first function of collecting monitoring data output from each of the plurality of processes;

a second function of using a monitoring model set for each of the plurality of processes to output at least one monitoring result based on the monitoring data for each process; and a third function of controlling learning of the monitoring model for each process, wherein the third function includes:
storing, in chronological order, first monitoring data in a first process, second monitoring data in a second process upstream or downstream of the first process, and at least one monitoring result from the first process output from a first monitoring model using the first monitoring data as an input parameter; and performing parent model learning processing for the first monitoring model by using the first monitoring data and the monitoring result from the first monitoring model and performing child model learning processing for a second monitoring model by using a monitoring result from the first monitoring model at a first time as teacher data and using the second monitoring data at a second time as an input parameter, the second time being shifted from the first time by a transition period, wherein the performing of the child model learning processing for the second monitoring model is performed by using the monitoring result from the first monitoring model at the first time obtained as teacher data and using, as input parameters, the second monitoring data obtained in the second process at the second time and the first monitoring data obtained in the first process at a same time as the second time.

* * * * *